United States Patent [19]

Lamb et al.

[11] Patent Number: 4,525,095
[45] Date of Patent: Jun. 25, 1985

[54] DRIVING AND ALIGNING COUPLING

[75] Inventors: Miles P. Lamb, Colonia; Herman S. Karol, Morris Township, Morris County, both of N.J.

[73] Assignee: Westinghouse Electric Corp., Pittsburgh, Pa.

[21] Appl. No.: 623,745

[22] Filed: Jun. 22, 1984

[51] Int. Cl.³ .............................................. F16D 1/00
[52] U.S. Cl. ...................................... 403/16; 403/26; 403/322; 403/358
[58] Field of Search ................. 403/358, 356, 16, 369, 403/370, 26, 322

[56] References Cited

U.S. PATENT DOCUMENTS

| | | | |
|---|---|---|---|
| 783,762 | 2/1905 | Stahl | 403/358 |
| 1,434,433 | 11/1922 | Ettinger | 403/358 X |
| 1,518,716 | 12/1924 | Waugh | 403/356 |
| 2,480,222 | 8/1949 | Carlson | 403/358 X |
| 4,053,244 | 10/1977 | Dively | 403/16 X |

Primary Examiner—Andrew V. Kundrat
Attorney, Agent, or Firm—D. R. Lackey

[57] ABSTRACT

A coupling for positively engaging solid and hollow driving and driven shafts, and for achieving shaft concentricity. Inclined and straight registering surfaces in the two shafts are coupled with keys having mating surfaces, with the keys being independently axially movable by bolts engaged with tapped openings in one of the shafts.

13 Claims, 5 Drawing Figures

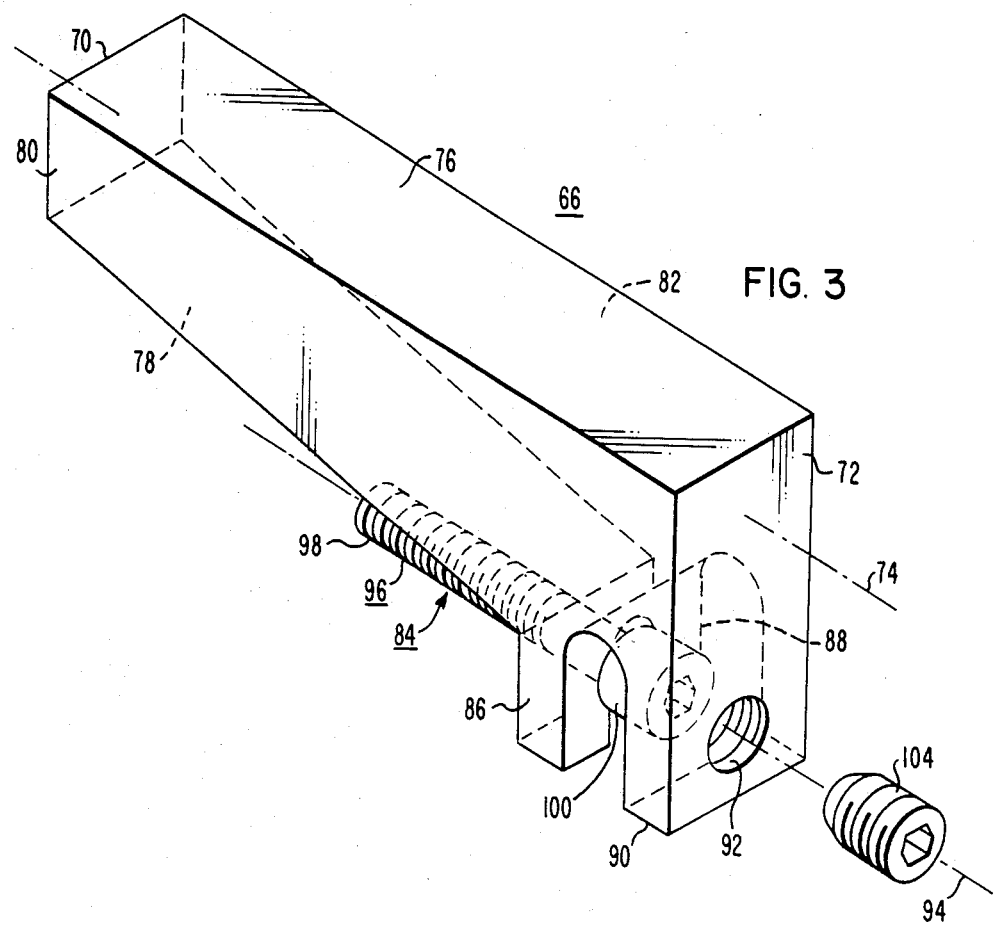
FIG. 3
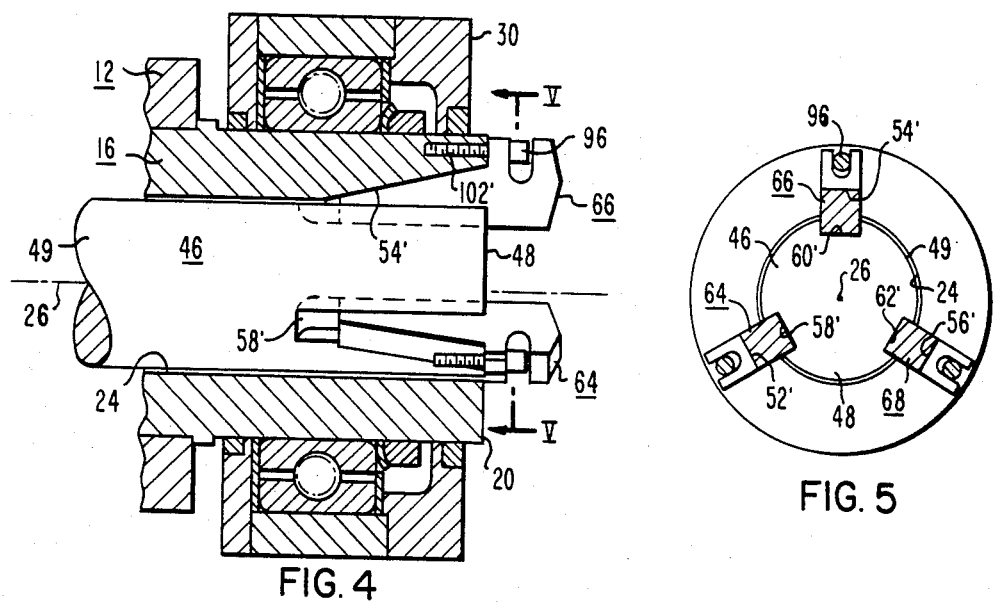
FIG. 4
FIG. 5

DRIVING AND ALIGNING COUPLING

BACKGROUND OF THE INVENTION

1. Field of the Invention

The invention relates in general to shaft couplings, and more specifically to couplings for positively engaging and aligning a solid and a hollow shaft.

2. Description of the Prior Art

Many applications require the coupling of a solid shaft with a hollow shaft, with one of the shafts being a drive shaft, and the other a driven shaft. For example, in a traction elevator system, the traction sheave may be fixed to a hollow shaft, the ends of which are supported by bearings. A solid shaft from a drive motor may extend completely through the hollow shaft, such as shown in U.S. Pat. No. 4,355,785, which is assigned to the same assignee as the present application. The coupling between the shafts occurs at the end of the solid shaft.

In addition to a positive drive coupling between solid and hollow shafts, it is important that the two shafts be concentric. Since clearance adjacent to the drive motor may be a problem, it would be desirable to provide a new and improved shaft coupling arrangement which reduces the extension of the motor shaft into the hollow shaft, facilitating removal and replacement of the drive motor, as well as mitigating torsional problems. Any arrangement for performing this function, however, must be accompanied by means for easily achieving shaft concentricity.

SUMMARY OF THE INVENTION

Briefly, the present invention is a new and improved coupling arrangement for positively coupling, and easily aligning, a solid shaft with a hollow shaft. In a preferred embodiment, three shallow-taper, self-locking keys engage inclined keyways in the solid shaft and straight or parallel keyways in the hollow shaft, near the entry end of the hollow shaft. Adjustment means on each key is disposed towards the concentric shaft centers, enabling actuation of the adjustment means through the shaft opening. The adjustment means includes legs on each key which capture the head of a bolt or screw, such as an Allen bolt, with the threaded end of the bolt being engaged with a tapped opening in the end of the solid shaft.

When it is desired for some reason to extend the solid shaft completely through the hollow shaft, the same key and the same coupling arrangement may be used to couple the two shafts. The keys may be used in the same orientation used with the short solid shaft, or each key may be used in an orientation in which is it rotated 180° about its longitudinal axis. In the latter instance, the inclined keyway and tapped openings for the adjustment means would be in the hollow shaft, instead of in the solid shaft.

BRIEF DESCRIPTION OF THE DRAWINGS

The invention may be better understood, and further advantages and uses thereof more readily apparent, when considered in view of the following detailed description of exemplary embodiments, taken with the accompanying drawings in which:

FIG. 3 is a perspective view of the key and its adjustment means shown in FIGS. 1 and 2;

FIG. 4 is a fragmentary, elevational view, partially in section, illustrating the coupling of the sheave and drive shown in FIG. 1 according to another embodiment of the invention; and FIG. 5 is a cross-sectional view of the coupling arrangement shown in FIG. 4, taken between and in the direction of arrows IV—IV.

DESCRIPTION OF THE PREFERRED EMBODIMENTS

Figure 1:
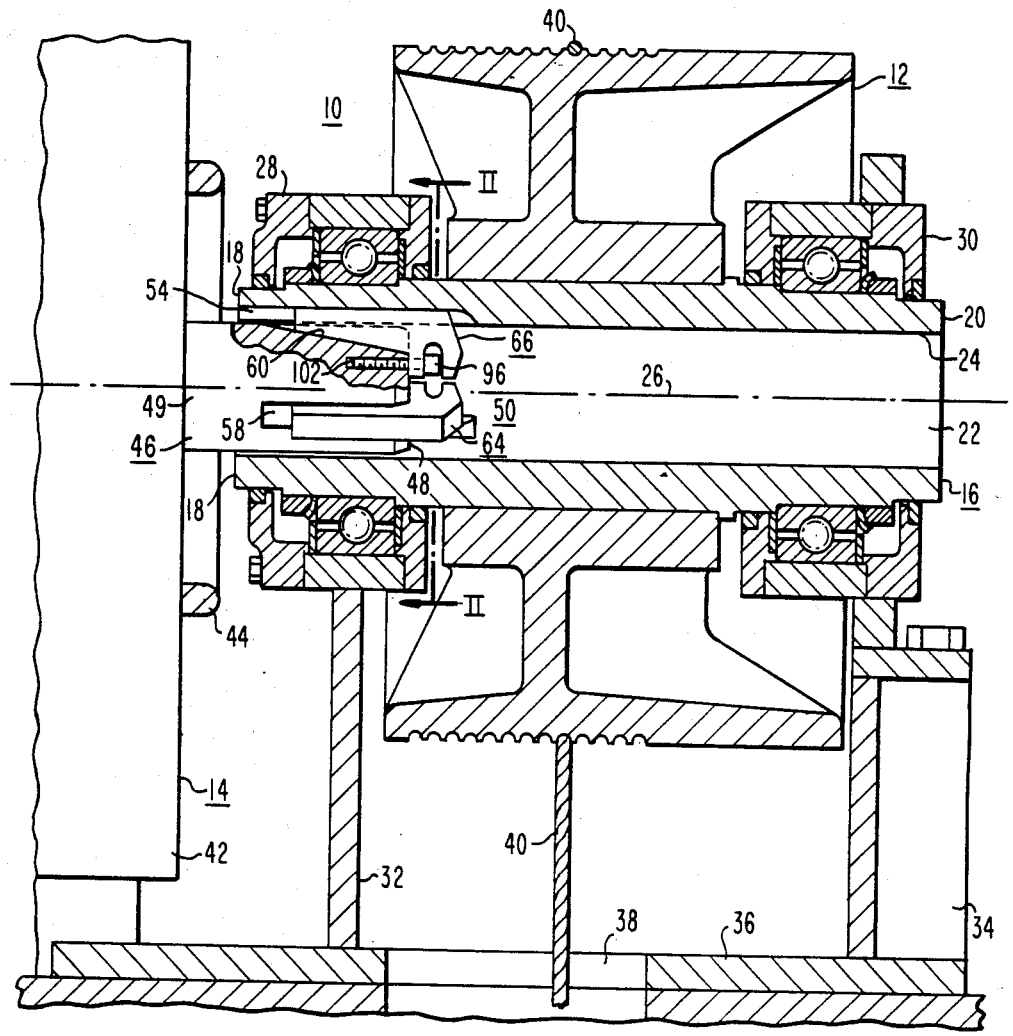
FIG. 1 is an elevational view, partially in section, of a traction elevator sheave and drive, coupled according to the teachings of the invention.

Referring now to the drawings, and to FIG. 1 in particular, there is shown an elevational view, partially in section, of a traction elevator system 10 having a sheave 12 and a drive motor 14. Sheave 12 is fixed to a hollow shaft 16 having first and second ends 18 and 20, respectively, and an opening 22 which extends between its ends. Opening 22 is defined by an inner surface 24. Shaft 16 is journaled for rotation about a longitudinal axis 26 via bearings 28 and 30 disposed at the first and second ends 18 and 20, respectively, of shaft 16. Bearings 28 and 30 are supported by pedestals 32 and 34 and a base 36. Base 36 has an opening 38 through which a pluarality of wire hoist ropes pass, such as hoist rope 40.

Drive motor 14, which may be an AC or DC motor, includes a stator 42 and a rotor 44. Stator 42 may be mounted from base 36 via support arms (not shown), such as illustrated in the hereinbefore mentioned U.S. Pat. No. 4,355,785, or it may be supported in any conventional manner, as desired. Rotor 14 includes a shaft 46 which may be solid, having a first end 48 which is supported within hollow shaft 16. A second end of shaft 46 (not shown), is also supported by a bearing, such as shown in the '785 patent. Shaft 46 includes on outer surface 49 which defines its O.D.

The hollow and solid shafts 16 and 46, respectively, are coupled by a coupling arrangement 50, which, according to the teachings of a first embodiment of the invention couples the shafts adjacent to their first ends 18 and 48, enabling the motor shaft 46 to be relatively short. This enables motor 14 to be removed from its coupled position with sheave 12 without requiring a lot of space in back of the motor.

Figure 2:
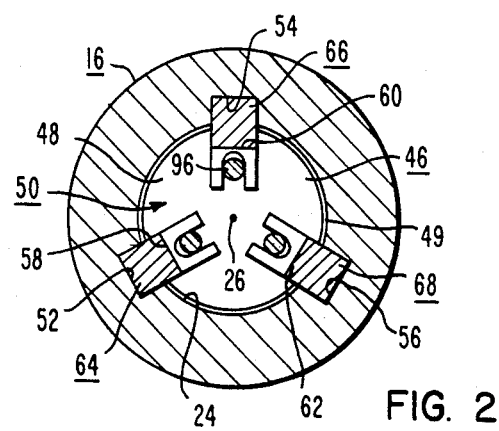
FIG. 2 is a sectional view through the hollow shaft, taken adjacent to the end of the solid shaft, between and in the direction of arrows II—II in FIG. 1.

Coupling means 50 includes first, second and third keyways 52, 54 and 56 in the I.D. of hollow shaft 16. As best shown in FIG. 2, which is a cross-sectional view taken through hollow shaft 16 adjacent to the first end 48 of the solid shaft 46, keyways 52, 54 and 56 are uniformly spaced 120° apart about the I.D. of shaft 16, with the keyways 52, 54 and 56 starting at the first end 18 of the hollow shaft. Keyways 52, 54 and 56 are flat bottomed, with the plane of the flat bottom being parallel with a longitudinal plane disposed through the longitudinal axis 26.

Coupling means 50 further includes first, second and third keyways 58, 60 and 62 formed in the O.D. of solid shaft 46. Keyways 58, 60 and 62 are uniformly spaced 120° apart about the O.D. of shaft 46, with the keyways 58, 60 and 62 starting at the first end 48 of the solid shaft. Keyways 58, 60 and 62 are flat bottomed, with the plane of the flat bottom being inclined relative to a longitudinal plane through axis 26. The flat bottoms of keyways 58, 60 and 62 start at the outer surface 49, a predetermined dimension from end 48, and they angle inwardly from surface 49 to a predetermined depth at their intersection with the first end 48. The same cutter which forms the straight or parallel keyways 52, 54 and 56 may be used to form the inclined keyways, by setting the cutting head to proceed at a predetermined angle relative to the longitudinal axis 26 of shaft 46.

Coupling means 50 also includes first, second and third keys 64, 66 and 68, respectively, all of like construction, with key 66 being shown in an enlarged perspective view in FIG. 3. Key 66 is an elongated metallic block having first and second ends 70 and 72, a longitudinal axis 74, a non-inclined side 76 disposed on one side of axis 74, an inclined side 78 disposed on the opposite side of axis 74, and parallel sides 80 and 82 which extend between the non-inclined and inclined sides 76 and 78, respectively. Parallel sides 80 and 82 are spaced to snugly slide in the keyways of shafts 16 and 46, with the non-inclined side 76 mating with the flat bottom of one of the straight keyways 52, 54 or 56, and with the inclined sides 78 mating with the flat bottom of one of the inclined keyways 58, 60 or 62. Thus, the angle selected for inclined sides 78 should match the angle of keyways 58, 60 and 62.

Keys 64, 66 and 68 include adjustment means, such as adjustment means 84 associated with key 66. Adjustment means 84 includes first and second leg portions 86 and 88, which extend perpendicularly outward from the side of key 66 which includes the inclined side 78. Legs 86 and 88 are perpendicular to the longitudinal axis 74, not to the surface of the inclined side 78. Inclined side 78 terminates when it reaches the first and second legs 86 and 88. Legs 86 and 88 are laterally spaced apart, with respect to the longitudinal axis 74. A third leg portion 90 is axially spaced from the first and second legs 86 and 88, with the third leg terminating at the second end 72 of the key. A threaded or tapped opening 92 is disposed completely through the third leg portion 90 on an axis 94 which extends perpendicularly outward through the second end 72 of key 66 and bisects the spacing between the spaced first and second legs 86 and 88. Axis 94 is parallel with the longitudinal axis 74.

Adjustment means 84 further includes a bolt 96, preferably a socket head cap screw or bolt, having a threaded shank 98 and a head 100. Bolt 96 cooperates with a tapped opening in the first end 48 of the solid shaft 46, such as tapped opening 102 associated with key 66 in the FIG. 1 view. The first and second legs 86 and 88 are spaced to snugly but slidably receive the threaded end 98 of bolt 96, while preventing head 100 from moving in one axial direction. The spacing from the third leg 90 to the first and second legs 86 and 88 is selected to slidably receive the axial dimension of head 100, while permitting turning of the head by an Allen wrench. The third leg 90 prevents axial movement of bolt 96 in the other axial direction. When bolt 96 is threadably engaged with a tapped opening 102 and key 66 is disposed into position over bolt 96, the longitudinal axis of bolt 96 is coaxial with the axis 94 of tapped opening 92.

In the coupling of solid shaft 46 with the hollow shaft 16, three bolts 96 are engaged with associated tapped openings 102 in the first end 48 of the solid shaft, and keys 64, 66 and 68 are respectively positioned in keyways 58, 60 and 62 such that legs 86 and 88 straddle the threaded end 98 of bolt 96. The head 100 is "captured" between leg 90 and legs 86 and 88. The rotor 44, or sheave 12, is turned such that keyways 58, 60 and 62 are in registry with keyways 52, 54 and 56, respectively, and the first end 48 of shaft 46 is advanced into the first end 18 of hollow shaft 16. The keys advance into the cooperatively formed keyways, until the solid shaft has been advanced to the desired operative position. Shaft concentricity is then checked with a dial indicator and adjusted by relative axial positioning of all three keys until the dial indicator indicates concentricity has been achieved. It will be noted that the three Allen head bolts are clustered towards the axis or center 26, making it relatively easy to actuate the bolts with an Allen wrench from the second end 20 of shaft 16, through opening 22. Movement of a bolt 96 automatically carries its associated key with it, since the head 100 is captured by the legs of the associated key. The selected position of bolt 96 is locked by a jam or set screw 104 which is engaged with the tapped opening 92 and forced against the head 100 of bolt 96. The three shallow-taper, self-locking keys 64, 66 and 68 provide positive transmission of both radial and torsional loads between the solid and hollow shafts.

FIGS. 1 and 2 set forth the preferred embodiment of the invention, because the solid shaft 46 may be relatively short, enabling removal of the drive motor 14 with very little clearance behind the motor. It will also be apparent that adjustment means 50 may be used in the same configuration as in the FIG. 1 embodiment, to couple the two shafts when the solid shaft extends all the way to the second end 20 of the hollow shaft. The adjustment means 50 may also be used without modification to couple a solid and hollow shaft when the solid shaft extends all the way to the second end of the hollow shaft, by simply flipping over each of the keys. FIGS. 4 and 5 set forth this second embodiment of the invention, with FIG. 4 being a fragmentary, elevational view, partially in section, of the second end 20 of hollow shaft 16 and the associated bearing means 30. FIG. 5 is a cross-sectional view of the coupling arrangement shown in FIG. 4, taken between and in the direction of arrows V—V in FIG. 4. In this second embodiment, each key is rotated 180° about its longitudinal axis 74, compared with its orientation in the first embodiment. The inclined keyways and tapped openings are in the hollow shaft 16, and the straight keyways are in the solid shaft 46. The bolts 96, in the second embodiment, are spaced further apart than in the first embodiment, but there is no space limitation relative to the adjustment means 84 in the second embodiment.

More specifically, keyways 58', 60' and 62' in solid shaft 46 have flat bottoms oriented parallel with a longitudinal plane through the longitudinal axis 26, while keyways 52', 54' and 56' have flat bottoms, the planes of which are inclined, with the inclined planes intersecting a longitudinal plane through the longitudinal axis 26. The inclined keyways 52', 54' and 56' start at the second end 20 of the hollow shaft 16, between its inner and outer surfaces, and they angle inwardly at a predetermined angle until intersectibng the inner surface 24. The tapped openings, such as tapped opening 102', are formed in the second end 20 of the hollow shaft 16.

In the second embodiment, the solid shaft is advanced all the way through opening 22 of the hollow shaft, until end 48 of the solid shaft 46 is substantially flush with the end 20 of the hollow shaft 16. Just before the end 48 of shaft 16 reaches the keyways, the circumferential positions of the keyways are adjusted until they are in registry, the bolts 96 are threadably engaged with the tapped openings 102', and the keys 64, 66 and 68 are placed into position on their respective bolts. The solid shaft may then be advanced the rest of the way, to capture the keys in the cooperatively formed keyways. Concentricity is achieved as in the first embodiment, with a dial indicator while axially positioning all three keys in their respective keyways, until concentricity is achieved. A jam screw 104 maintains the selected position of each key.

We claim:

1. A driving and aligning coupling, comprising: a solid shaft having a first end and outer surface, with said outer surface defining first, second and third uniformly spaced, axially extending flat bottomed keyways which start at its first end, a hollow shaft having first and second ends, and an opening which extends between its ends, said solid shaft being disposed within the opening of said hollow shaft, with said hollow shaft further including first, second and third axially extending, flat bottomed keyways in registry with the first, second and third keyways, respectively, of said solid shaft, said keyways of one shaft being inclined and the keyways of the remaining shaft being parallel, with respect to longitudinal planes through the respective shafts, first, second and third keys in the registering keyways, with each of said keys having a longitudinal axis and oppositely disposed longitudinally extending inclined and non-inclined flat sides corresponding to the inclined and parallel keyways, respectively, adjustment means for independently adjusting the axial positions of said first, second and third keys to concentrically align the solid and hollow shafts, said adjustment means including first, second and third bolts each having a threaded end engaged with a tapped opening in one of said shafts, and a head linked with a key, bearing means for rotatably supporting the first and second ends of said hollow shaft, with said solid shaft being a driving shaft, and a sheave fastened to said hollow shaft.

2. The coupling of claim 1 wherein the first end of the solid shaft extends into the first end of the hollow shaft, with the keyways of the hollow shaft starting at its first end, and with the adjustment means being disposed inside the hollow shaft, actuatable from the second end of the hollow shaft.

3. The coupling of claim 1 wherein the first end of the solid shaft extends into the first end of the hollow shaft, all the way to its second end, with the keyways of the hollow shaft starting at its second end, and with the adjustment means being external to both shafts.

4. The coupling of claim 3 wherein the inclined keyways and tapped openings are in the hollow shaft.

5. The coupling of claim 1 wherein the first, second and third keys each include first and second laterally spaced legs, relative to the longitudinal axis of the key, and a third leg axially spaced from the first and second legs, with the inclined side of the key intersecting said first and second legs, and wherein the bolt head is captured by said first, second and third legs.

6. The coupling of claim 5 wherein the threaded end extends between the first and second legs, with the first and second legs preventing axial motion of the bolt head in one direction, and with the third leg preventing axial motion of the bolt head in the other axial direction.

7. The coupling of claim 5 wherein the first, second and third legs of each of the first, second and third keys extend outwardly, relative to the longitudinal axes of said shafts.

8. The coupling of claim 5 wherein the bolts have actuating openings in their heads, and including an opening in the third leg of each key aligned with the actuating opening.

9. The coupling of claim 1 wherein the first, second and third keys, upon 180° rotation about their longitudinal axes, are usable without modification for the location of the inclined keyway in either shaft.

10. The coupling means of claim 1 wherein the first end of the solid shaft extends into the first end of the hollow shaft, with the keyways of the hollow shaft starting at its first end, with the adjustment means being disposed inside the hollow shaft, actuatable from the second end of the hollow shaft, and wherein the bolts of the adjustment means are disposed adjacent to the longitudinal axes of the concentric solid and hollow shafts.

11. A driving and aligning coupling, comprising: a solid shaft having a first end and outer surface, with said outer surface defining first, second and third uniformly spaced, axially extending flat bottomed keyways which start at its first end, a hollow shaft having first and second ends, and an opening which extends between its ends, said solid shaft being disposed within the opening of said hollow shaft, with said hollow shaft further including first, second and third axially extending, flat bottomed keyways in registry with the first, second and third keyways, respectively, of said solid shaft, said keyways of one shaft being inclined and the keyways of the remaining shaft being parallel, with respect to longitudinal planes through the respective shafts, first, second and third keys in the registering keyways, with each of said keys having a longitudinal axis and oppositely disposed longitudinally extending inclined and non-inclined flat sides corresponding to the inclined and parallel keyways, respectively, and adjustment means for independently adjusting the axial positions of said first, second and third keys to concentrically align the solid and hollow shafts, said adjustment means including first, second and third bolts each having a threaded end engaged with a tapped opening in one of said shafts, and a head linked with a key, said first end of the solid shaft extending into the first end of the hollow shaft, with the keyways of the hollow shaft starting at its first end, and with the adjustment means being disposed inside the hollow shaft, actuatable from the second end of the hollow shaft, said inclined keyways and tapped openings being in the solid shaft.

12. A driving and aligning coupling, comprising: a solid shaft having a first end and outer surface, with said outer surface defining first, second and third uniformly spaced, axially extending flat bottomed keyways which start at its first end, a hollow shaft having first and second ends, and an opening which extends between its ends, said solid shaft being disposed within the opening of said hollow shaft, with said hollow shaft further including first, second and third axially extending, flat bottomed keyways in registry with the first, second and third keyways, respectively, of said solid shaft, said keyways of one shaft being inclined and the keyways of the remaining shaft being parallel, with respect to longitudinal planes through the respective shafts, first, second and third keys in the registering keyways, with each of said keys having a longitudinal axis and oppositely disposed longitudinally extending inclined and non-inclined flat sides corresponding to the inclined and parallel keyways, respectively, and adjustment means for independently adjusting the axial positions of said first, second and third keys to concentrically align the solid and hollow shafts, said adjustment means including first, second and third bolts each having a threaded end engaged with a tapped opening in one of said shafts, and a head linked with a key, said first, second and third keys each including first and second laterally spaced legs, relative to the longitudinal axis of the key, and a third leg axially spaced from the first and second legs, with the inclined side of the key intersecting said first and second legs, said bolt head being captured by said first, second and third legs, said first, second and third legs of each of the first, second and third keys extending inwardly, relative to the longitudinal axes of said shafts.

13. A driving and aligning coupling, comprising: a solid shaft having a first end and outer surface, with said outer surface defining first, second and third uniformly spaced, axially extending flat bottomed keyways which start at its first end, a hollow shaft having first and second ends, and an opening which extends between its ends, said solid shaft being disposed within the opening of said hollow shaft, with said hollow shaft further including first, second and third axially extending, flat bottomed keyways in registry with the first, second and third keyways, respectively, of said solid shaft, said keyways of one shaft being inclined and the keyways of the remaining shaft being parallel, with respect to longitudinal planes through the respective shafts, first, second and third keys in the registering keyways, with each of said keys having a longitudinal axis and oppositely disposed longitudinally extending inclined and non-inclined flat sides corresponding to the inclined and parallel keyways, respectively, adjustment means for independently adjusting the axial positions of said first, second and third keys to concentrically align the solid and hollow shafts, said adjustment means including first, second and third bolts each having a threaded end engaged with a tapped opening in one of said shafts, and a head linked with a key, said first, second and third keys each including first and second laterally spaced legs, relative to the longitudinal axis of the key, and a third leg axially spaced from the first and second legs, with the inclined side of the key intersecting said first and second legs, said bolt head being captured by said first, second and third legs, said bolts having actuating openings in their heads, an opening in the third leg of each key aligned with the actuating opening, said opening in the third leg of each key being tapped, and a jam screw in each tapped opening which maintains the selected position of each bolt.

* * * * *